United States Patent [19]

Okita et al.

[11] Patent Number: 4,618,951
[45] Date of Patent: Oct. 21, 1986

[54] DISC CLAMP DEVICE

[75] Inventors: Masao Okita; Satoshi Sakai, both of Furukawa, Japan

[73] Assignee: Alps Electric Co., Ltd., Japan

[21] Appl. No.: 724,196

[22] Filed: Apr. 17, 1985

[30] Foreign Application Priority Data

Apr. 19, 1984 [JP] Japan .............................. 59-56699[U]

[51] Int. Cl.[4] .............................................. G11B 3/62
[52] U.S. Cl. ................................................. 369/270
[58] Field of Search ................................. 369/270, 271

[56] References Cited

U.S. PATENT DOCUMENTS

| 3,768,815 | 10/1973 | Mathurin | 369/270 |
| 4,125,883 | 11/1978 | Rolph | 360/99 |
| 4,323,870 | 11/1980 | Iemenschot | 369/271 |
| 4,408,318 | 10/1983 | Sugiura | 369/270 |

Primary Examiner—Steven L. Stephan
Attorney, Agent, or Firm—Guy W. Shoup

[57] ABSTRACT

A disc clamp device comprises a turntable formed at its center with a concave portion, an elevatable frame with a shaft, and a clamp member mounted on the shaft. The clamp member has in an integral form an arm supported by the shaft, pressing faces formed at the tip of the arm in opposition to the turntable, and guide portions extending from the inside of the pressing faces in the direction of fitting in the concave portion of the turntable.

5 Claims, 8 Drawing Figures

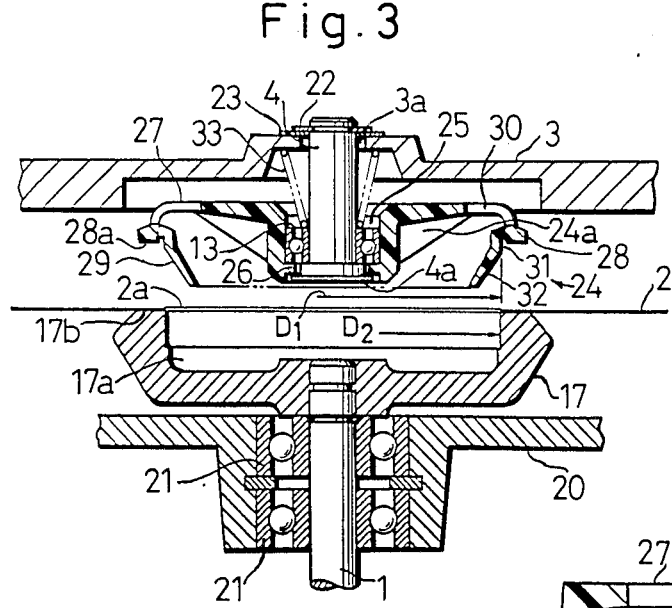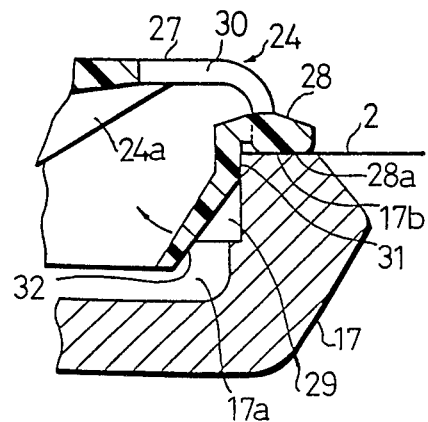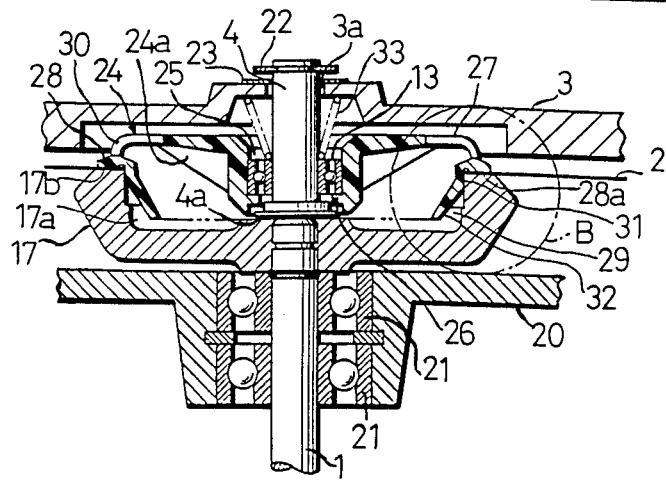

DISC CLAMP DEVICE

FIELD OF THE INVENTION

The present invention relates to a disc clamp device, provided inside a recording/reproducing device, for holding a disc to give a turning force thereto.

BACKGROUND OF THE INVENTION

Some recently-marketed information processors employ the magnetic recording/reproducing device. This recording/reproducing device operates in such a manner that after a disc (for example, a flexible magnetic disc) is attached to a spindle, this spindle is driven to rotate the disc. While it is rotated, a magnetic head is opposed to the recording surface of the disc to perform recording/reproducing of information.

The prior art will be described in detail with reference to FIG. 1 which is a sectional view of the conventional disc clamp device to be employed in the recording/reproducing device and FIG. 2 which is an enlarged sectional view of portion A of FIG. 1.

In this device, after a disc 2 is placed on a turntable 17 secured to a spindle 1, a frame 3 is moved down manually, for instance. On this frame 3 a shaft 4 is hung, a tapered face 11a of a hub 11 mounted rotatably on the lower end of the shaft 4 enters into a center hole 2a of the disc 2 in response to the downward movement of the frame 3. Then, the center hole 2a of the disc 2 moves in radial directions while being guided by the tapered face 11a to achieve the provisional centering action. At the same time, the hub 11 fits in a concave portion 17a formed in the turntable 17. Then, as the frame 3 moves down further, a collet 12 mounted on the shaft 4 via a bearing 13 and urged by a clamp spring 5 moves down into the hub 11. Because plural slits (not shown) are formed in the tapered face 11a of the hub 11, in response to the downward movement of the collet 12 the tapered face 11a is expanded, and the center hole 2a of the disc 2 is pushed in horizontal directions in the drawing, whereby the subject centering action is achieved. During the above operation, a pressing face 11b of the hub 11 pushes the disc 2 onto the upper surface of the turntable 17 to clamp the disc 2 thereon. The number 14 designates a return spring to return the collet 12 to its initial pose.

However, the conventional disc clamp device described hereinabove has the following problems:

(1) Because the centering action of the disc 2 relative to the spindle 1 is achieved through the indirect positioning function by means of the hub 11 and the collet 12, the degree of centering accuracy is limited to a certain extent. Accordingly, the conventional device is hardly applicable to the recently-developed high-density information recording system where a track pitch is narrowed.

(2) Further, because both the clamping and centering actions of the disc 2 are performed by the hub 11, there is the probability that the clamping and centering actions would take place simultaneously or in the reverse order. In the above case, an unreasonable force is applied to the center hole of the disc and the disc is clamped before the accurate centering action is achieved.

(3) If the pushing force of the collet 12 against the hub 11 is strengthened in order to assure the clamping of the disc 2, the pressing face 11b of the hub 11 inclines toward the bottom of the concave portion 17a of the turntable 17, as shown in FIG. 2. As a result, the clamping strength against the disc 2 becomes uncertain, the degree of centering accuracy lowers, and the disc 2 is damaged because of inclination of the pressing face 11b.

(4) Furthermore, because the hub 11 and the collet 12 are independent members, the number of parts increases and the device structure becomes complicated. Correspondingly, the lowering of manufacturing efficiency and the cost-up of the device result.

SUMMARY OF THE INVENTION

The present invention has been devised in view of the foregoing problems of the prior art, and its object is to provide a disc clamp device of the structure in that its structure is simple, its manufacturing efficiency is enhanced, a disc receives the accurate centering action without any damage and is clamped surely.

In brief, the disc clamp device according to the present invention resides in the type in which at the axial center of a turntable to be driven and rotated a concave portion is formed whose diameter is the same as that of a center hole of a disc, above the turntable a frame is provided elevatably in opposition to the turntable, and on a shaft supported by the frame a clamp member is mounted, and is characterized in that the clamp member is composed of pressing faces opposing to the turntable, guide portions extending from the inside of the pressing faces in the direction of fitting in the concave portion, and an arm extending on the upper side of the pressing faces from outward the guide portions to a portion to be supported by the shaft, whereby as the guide portions are fitted in the concave portion of the turntable, the outer peripheral faces of the guide portions push the center hole to correct the movement in radial directions of the disc thereby to perform the centering action, and then, the pressing faces which receive the pressing force from the arm push the disc onto the upper surface of the turntable.

BRIEF DESCRIPTION OF THE DRAWINGS

FIGS. 3 and 4 are sectional views in different operation stages of an embodiment of the disc clamp device according to the present invention;

FIG. 5 is an enlarged view of portion B of FIG. 4;

DETAILED DESCRIPTION OF THE INVENTION

Figure 1:
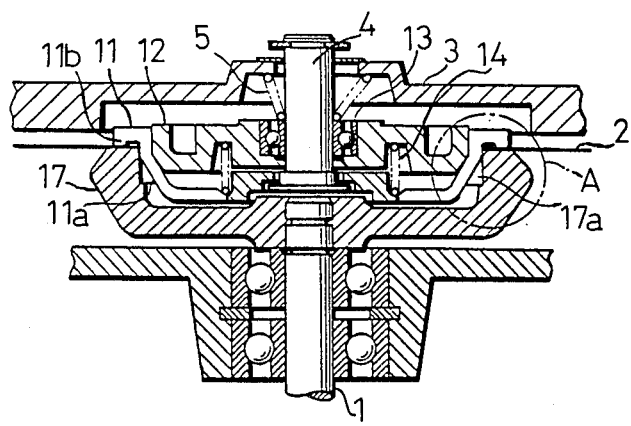
FIG. 1 is a sectional view of the conventional disc clamp device.
Figure 2:
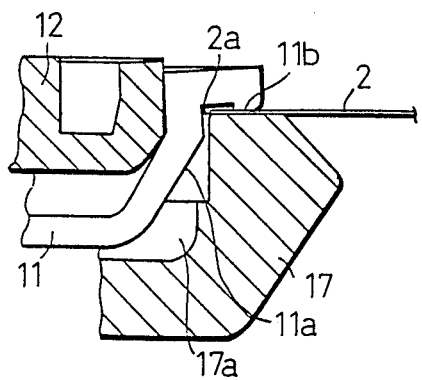
FIG. 2 is an enlarged view of portion A of FIG. 1.

The embodiment according to the present invention will be described with reference to FIG. 3 and so forth, which is assembled in the recording/reproducing device for driving the magnetic disc.

In these drawings, the number 20 designates a base frame. On this base frame 20 a spindle 1 coupled to a motor (not shown) is supported via a bearing 21. At the upper end of this spindle 1 a turntable 17 is secured. In the center of this turntable 17 a concave portion 17a is formed centering at the spindle 1. On an upper surface 17b of the turntable 17 a flexible magnetic disc 2 is placed. A center hole 2a bored in the center of the magnetic disc 2 has substantially the same diameter as that of the concave portion 17a.

The number 3 designates a frame. This frame 3 is opposing to the turntable 17 and movable toward and away from the same. In the frame 3 a hole 3a is bored whose axial position corresponds to that of the spindle 1, through this hole 3a a shaft 4 is inserted. This shaft 4 has a diameter smaller than that of the hole 3a, thus, it is allowed to shift in radial directions within the hole 3a. At the upper end of the shaft 4 a stop member 22 is secured. This stop member 22 rides on the upper face of the frame 3 via a washer 23 to prevent the shaft 4 from falling out. On the other hand, at the lower end of the shaft 4 a clamp member 24 is mounted via a bearing 13.

Figure 6:
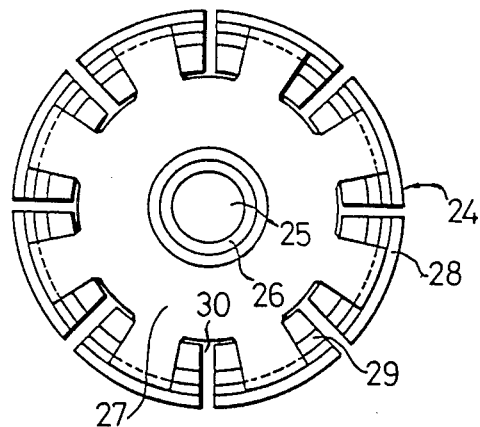
FIG. 6 is a plan view of a clamp member.
Figure 7:
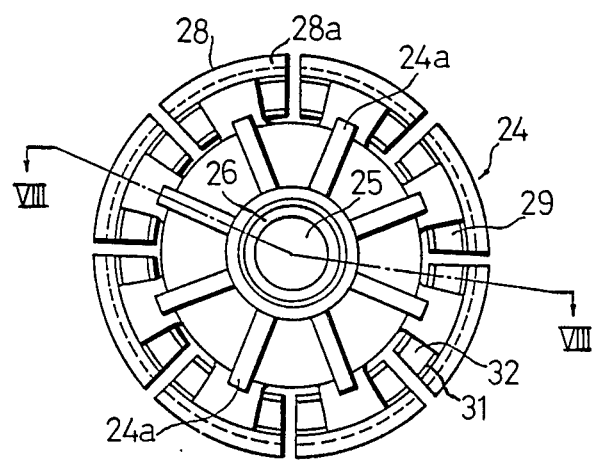
FIG. 7 is a bottom view of the clamp member.
Figure 8:
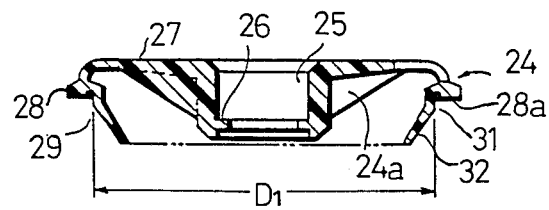
FIG. 8 is a sectional view taken along line VIII—VIII in FIG. 7.

The structure of this clamp member 24 will be described in detail with reference to FIGS. 6 through 8. This clamp member 24 is made by resin and formed in an integral body.

In the center of the clamp member 24 a hole 25 is bored, in the lower portion of this hole 25 projections 26 are arranged circularly which are facing inward the hole 25. The bearing 13 press-inserted in the hole 25 is engaged with these projections 26 and fixed there. Into a portion of the hole 25 positioned underside the projections 26 a flange 4a formed at the lower end of the shaft 4 is brought, this flange 4a is engaged with the projections 26. From the whole upper periphery of the hole 25 an arm 27 extends outward. Tips of the arm 27 are curved downward. On the end faces of the curved tips pressing portions 28 are formed. That is, to the upper faces of these pressing portions 28 the tips of the arm 27 are coupled. The lower end of each pressing portion 28 forms a flat pressing face 28a. This pressing face 28a opposes to the upper surface 17b of the turntable 17. To the inside of the pressing portion 28 one end of a guide portion 29 is joined. Plural guide portions 29 are arranged on the inner periphery of the pressing portions 28 with a regular spacing. In the arm 27 relief holes 30 are bored for the purpose of removing a die in a molding process of respective guide portions 29. Each guide portion 29 is composed, as shown in FIG. 8, of an engaging face 31 extending from the inside of the pressing portion 28 downward vertically and a guide face 32 extending from the lower end of the engaging face 31 inward obliquely. The guide portion 29 is molded relatively thin, so that it possesses flexibility. The diameter $D_1$ of the engaging face 31 is formed a little larger than the inner diameter $D_2$ of the concave portion 17a of the turntable 17. Thus, the engaging face 31 fits tightly in the concave portion 17a while deforming plastically. The number 24a designates a reinforcing rib for supporting the arm 27.

Further, as shown in FIGS. 3 and 4, a compression spring 33 is interposed between the bearing 13 press-inserted in the hole 25 of the clamp member 24 and the inner face of the frame 3.

Now, the operation of the present disc clamp device of the foregoing structure will be described.

In the initial state, the frame 3 is previously elevated by a spring (not shown), for example. During this state, the clamp member 24 is pushed by the compression spring 33 via the bearing 13, and the projections 26 formed inside the hole 25 are engaged with the flange 4a formed on the shaft 4, so that the clamp member 24 is prevented from falling out.

The magnetic disc 2 is inserted through an insertion opening (not shown) of the recording/reproducing device, and the center hole 2a of the magnetic disc 2 is brought above the concave portion 17a of the turntable 17. Thereafter, the frame 3 is moved down by means of hand-operation, for instance. In response to the downward movement, the clamp member 24 approaches the turntable 17 gradually. Then, at first, the lower end of the guide face 32 of the clamp member 24 passes through the center hole 2a of the magnetic disc 2 and is brought inside the concave portion 17a of the turntable 17. During the above, the guide face 32 contacts slidingly with the center hole 2a of the magnetic disc 2, whereby the magnetic disc 2 is pushed in radial directions. Simultaneously with the above operation, if the shaft 4 has some axial discrepancy relative to the spindle 1, the guide face 32 is led toward the concave portion 17a of the turntable 17, whereby their axial centers are accorded with each other. Accordingly, during the downward movement of the clamp member 24, the center of the magnetic disc 2 is gradually aligned on the axial line of the spindle 1 (the provisional centering action). Then, as the engaging face 31 of the clamp member 24 is brought into the concave portion 17a of the turntable 17, since there is the relationship $D_1 > D_2$ between the diameter $D_1$ of the engaging face 31 and the inner diameter $D_2$ of the concave portion 17a, the engaging face 31 is guided by the peripheral margin of the concave portion 17a and elastically deformed inwardly (in the arrow direction), as shown in FIG. 5. During the above, the center hole 2a of the magnetic disc 2 is pushed by the engaging face 31 and becomes concentric with respect to the inner diameter $D_2$ of the concave portion 17a, whereby the subject centering action completes. With the above operation, the pressing face 28a of the pressing portion 28 formed on the clamp member 24 approaches the upper surface 17b of the turntable 17. Then, when the pressing face 28a abuts upon the upper surface 17b of the turntable 17 via the magnetic disc 2, the downward movement of the clamp member 24 stops. Then, as the frame 3 moves down further, the compression spring 33 is pushed. This pushing force is transmitted to the arm 27 through the bearing 13 and the projections 26 of the clamp member 24. Thus, the arm 27 pushes the pressing portion 28 from the above. As a result, the pressing face 28a pushes the magnetic disc 2 evenly toward the upper surface 17b of the turntable 17. By the above operation, the magnetic disc 2 is surely secured on the upper surface 17b of the turntable 17. Then, when the frame 3 reaches the bottom dead point, its downward movement stops, and the centering and clamping actions against the magnetic disc 2 terminate.

During the above operation, the flange 4a at the lower end of the shaft 4 is spaced from the projections 26 of the clamp member 24 and the clamp member 24 is pushed exclusively by the bearing 13, so that the shaft 4 itself is in the unrestrained state. Therefore, even if the turntable 17 is rotating in the course of the clamping action, the clamp member 24 starts to rotate smoothly while being supported by the bearing 13 without giving a load to the turntable 17. Thus, the guide portion 29 and pressing portion 28 of the clamp member 24 are not damaged frictionally by the concave portion 17a of the turntable 17, and the magnetic disc 2 does not suffer any damage.

Then, when the spindle 1 in the stationary state is driven, the magnetic disc 2 rotates, and the magnetic head (not shown) opposing to the recording surface of the magnetic disc 2 performs recording and reproducing of information.

As the frame 3 moves up, the clamp member 24 is returned to the initial state by the retaining strength of the compression spring 33. In modification, when the outer peripheral face of the guide portion 29 of the clamp member 24 is coated by fluorine resin, the coated guide portion 29 can contact slidingly with the magnetic disc 2 at low friction, thus, the centering action can be performed smoothly.

As apparent from the foregoing description, the present invention produces the following effects:

(1) In the disc clamp device of the structure in that the concave portion whose diameter is the same as that of the center hole of the magnetic disc is formed at the axial center of the turntable to be driven and rotated, and the frame is provided elevatably above the turntable and in opposition thereto; the present invention is featured in that on the frame the arm is supported via the shaft, at the tip of the arm the pressing faces are secured opposing to the turntable, and inside the pressing faces the guide portions are secured fittable with the concave portion. Accordingly, as the frame moves down, at first the guide portions engage with the concave portion of the turntable. As a result, the center hole of the disc is guided in radial directions of the concave portion directly by the guide portions, thereby to achieve the centering action. Thus, the degree of centering accuracy is remarkably increased. Therefore, the present disc clamp device is applicable enough to the recently-marketed high-density information recording system where the track pitch is narrowed.

(2) Following the above operation, the pressing faces clamp the disc onto the turntable, so that the clamping action and the centering action are performed in the proper order. Thus, an unreasonable force can not be applied to the center hole of the disc in the course of the centering action, and the peripheral margin of the center hole can not be damaged.

(3) In addition, because the tip of the arm is coupled to the upper side of the pressing portions and the pushing force from the frame is applied through the arm directly to the pressing faces substantially evenly from the vertical direction, the clamping pressure against the disc can be increased.

(4) Further, because the arm is provided outward the guide portions, the pressing faces do not incline toward the concave portion at the time of the clamping action and reliable clamping of the disc is assured beside the effect (3) noted above.

(5) Furthermore, because the clamp member is an integral body, a reduction in number of parts is promoted, the structure is simplified, as a result, manufacturing and assembling become easy, the production efficiency is improved, and the device cost can be reduced.

(6) Still more, when the guide portion has flexibility and its diameter is larger a little than the concave portion formed in the turntable, this guide portion is fitted tightly in the concave portion, as a result, the position of the center hole of the disc is corrected more accurately, whereby the centering action is performed more reliably.

While the preferred embodiment has been described, variations thereto will occur to those skilled in the art within the scope of the present inventive concepts which are delineated by the following claims.

What is claimed is:

1. In a disc clamp device of the type comprising a turntable having an axial center of rotation for supporting a disc medium to be clamped thereon and driven in a horizontal plane of rotation, said turntable having an annular vertical wall forming a concave portion concentric with its axial center and having a diameter substantially equal to a diameter of a center hole formed in the disc, and a frame provided elevatably above said turntable and movable downwardly to a clamping position in opposition thereto, a shaft mounted on said frame and aligned with said axial center of said turntable when said frame is moved to said clamping position, and a clamp member mounted on said shaft so as to be positioned in said concave portion of said turntable and to clamp the disc to said turntable in said clamping position, the improvement wherein said clamp member is formed as an integral member and includes a central hub mounted on said shaft, an arm connected to said central hub at one end thereof and extending downwardly and connected to a pressing face at the other end thereof, said pressing face of said clamp member having a horizontal clamping surface opposed to said turntable for clamping the disc thereon and a vertical engagement surface connected radially inwardly to said clamping surface for engagement with said vertical wall of said turntable, and a guide portion connected to said engagement surface of said pressing face and extending in a downwardly inclined direction toward said axial center and terminating in a free end located at a radial position inwardly of said radius of said concave portion, whereby as said frame is moved to said clamping position, said guide portion enters the center hole of the disc and said concave portion of said turntable so as to center the disc on said turntable and guides said engagement surface into engagement with said vertical wall of said concave portion of said turntable, and then said clamping surface of said pressing face is pressed downwardly on the disc to clamp it to said turntable.

2. A disc clamp device according to claim 1, wherein said engagement surface is provided at a radial position outwardly of said radius of said concave portion, and said clamp member is made flexible such that said engagement portion is deformable radially inwardly into engagement with said vertical wall of said turntable.

3. A disc clamp device according to claim 1, wherein said other end of said arm is curved vertically downward and is connected to said pressing face at a radial position outwardly of said radius of said concave portion, so as to exert only a vertical clamping force by said pressing face on the disc when said clamp member is moved to said clamping position.

4. A disc clamp device according to claim 1, wherein said clamp member comprises a plurality of corresponding arms, pressing faces, and guide portions spaced circumferentially around said central hub.

5. A disc clamp device as set forth in claim 1, wherein said guide portions are coated on their peripheral surfaces with fluorine resin.

* * * * *